United States Patent
Laskowski

(10) Patent No.: US 7,089,722 B2
(45) Date of Patent: Aug. 15, 2006

(54) ARTICULATING DECK MOWER WITH DECK HEIGHT ADJUSTER

(75) Inventor: Jeff Laskowski, Lizton, IN (US)

(73) Assignee: Wood-Mizer Products, Inc., Indianapolis, IN (US)

( * ) Notice: Subject to any disclaimer, the term of this patent is extended or adjusted under 35 U.S.C. 154(b) by 0 days.

(21) Appl. No.: 10/956,853

(22) Filed: Sep. 30, 2004

(65) Prior Publication Data

US 2006/0070366 A1 Apr. 6, 2006

(51) Int. Cl.
*A01D 34/03* (2006.01)
*A01D 34/43* (2006.01)
*A01D 34/64* (2006.01)

(52) U.S. Cl. ....................................... 56/14.9
(58) Field of Classification Search ................. 56/14.9, 56/6, 16.2, 15.9, 16.3, DIG. 3, DIG. 14, DIG. 22
See application file for complete search history.

(56) References Cited

U.S. PATENT DOCUMENTS

| | | | |
|---|---|---|---|
| 2,945,338 A | 7/1960 | Burrows et al. | |
| 3,063,226 A | 11/1962 | Pfauser | |
| 3,608,288 A | 9/1971 | Heth et al. | |
| 3,706,188 A | 12/1972 | Quiram | |
| 3,824,772 A * | 7/1974 | Sorenson et al. | 56/7 |
| 3,925,970 A | 12/1975 | Rusco | |
| 3,977,163 A | 8/1976 | Olin et al. | |
| 4,084,395 A | 4/1978 | Nannen | |
| 4,167,093 A | 9/1979 | Pfeiffer et al. | |
| 4,250,695 A | 2/1981 | Comer et al. | |
| 4,313,295 A | 2/1982 | Hansen et al. | |
| 4,321,784 A | 3/1982 | Wood et al. | |
| 4,370,846 A * | 2/1983 | Arnold | 56/6 |
| 4,384,443 A * | 5/1983 | Hoogstrate | 56/11.9 |
| 4,563,019 A | 1/1986 | Kuhn et al. | |
| 4,878,339 A | 11/1989 | Marier et al. | |
| 4,914,894 A | 4/1990 | Geiger | |
| 5,085,042 A | 2/1992 | Lansdowne | |
| 5,109,655 A | 5/1992 | Tekulve | |
| 5,297,378 A * | 3/1994 | Smith | 56/7 |
| 5,321,938 A | 6/1994 | LeBlanc | |
| 5,361,566 A | 11/1994 | Hohnl | |
| 5,463,853 A | 11/1995 | Santoli et al. | |
| 5,797,252 A | 8/1998 | Goman | |
| 5,809,756 A | 9/1998 | Scag et al. | |
| 5,816,035 A | 10/1998 | Schick | |
| 5,873,224 A | 2/1999 | Murakawa et al. | |
| 5,937,625 A | 8/1999 | Seegert | |
| 6,000,202 A | 12/1999 | Laskowski | |
| 6,012,274 A | 1/2000 | Eavenson et al. | |
| 6,044,631 A * | 4/2000 | Anderson et al. | 56/7 |
| 6,065,274 A | 5/2000 | Laskowski et al. | |
| 6,138,444 A | 10/2000 | Torras, Sr. | |
| 6,205,754 B1 | 3/2001 | Laskowski | |
| 6,244,025 B1 | 6/2001 | Ferris et al. | |
| 6,339,918 B1 | 1/2002 | Thomas | |
| 6,481,194 B1 | 11/2002 | Brewer et al. | |

(Continued)

OTHER PUBLICATIONS

Images of Mower, 4 pages (before Sep. 30, 2003).

*Primary Examiner*—Árpád Fábián Kovács
(74) *Attorney, Agent, or Firm*—Barnes & Thornburg LLP

(57) ABSTRACT

An articulating deck mower comprises a frame unit, relatively movable cutter decks, and a deck height adjuster. The deck height adjuster is configured for adjustment of the height of the cutter decks relative to the frame unit.

25 Claims, 13 Drawing Sheets

U.S. PATENT DOCUMENTS

| | | |
|---|---|---|
| 6,588,188 B1 | 7/2003 | Dennis |
| 6,651,415 B1 | 11/2003 | Burke |
| 6,684,615 B1 | 2/2004 | Bland et al. |
| 6,758,031 B1 | 7/2004 | Franet et al. |
| 2002/0157362 A1 | 10/2002 | Nunes, Jr. |
| 2002/0166313 A1 | 11/2002 | Gloudemans et al. |
| 2003/0024226 A1 | 2/2003 | Martignon |
| 2004/0148917 A1 | 8/2004 | Eastwood |

* cited by examiner

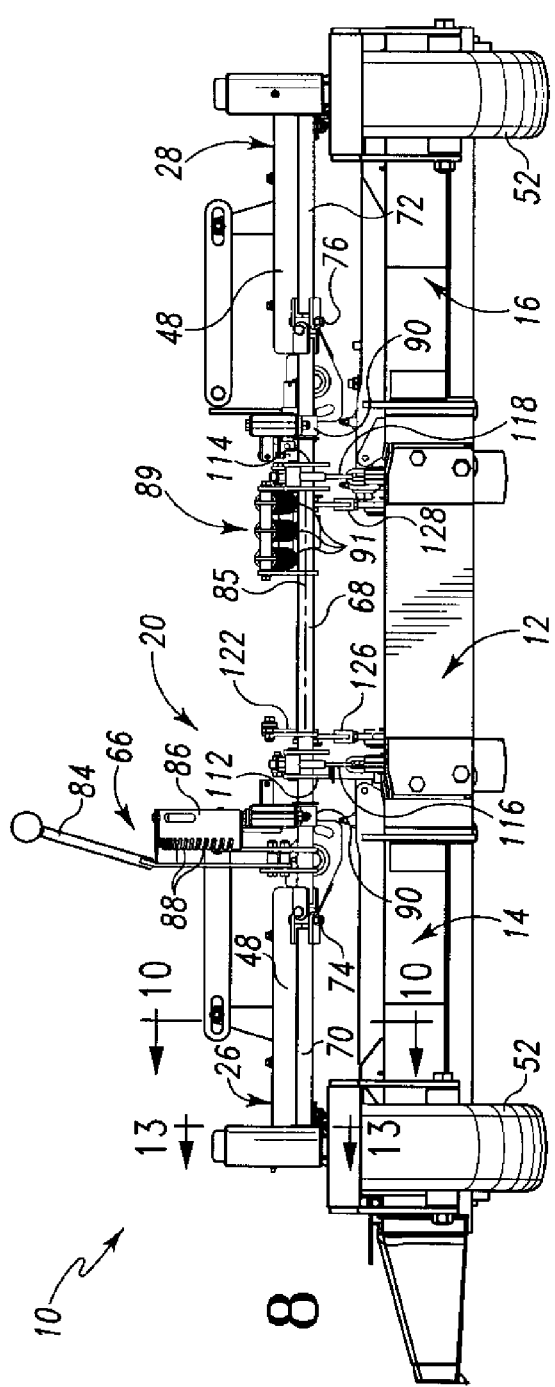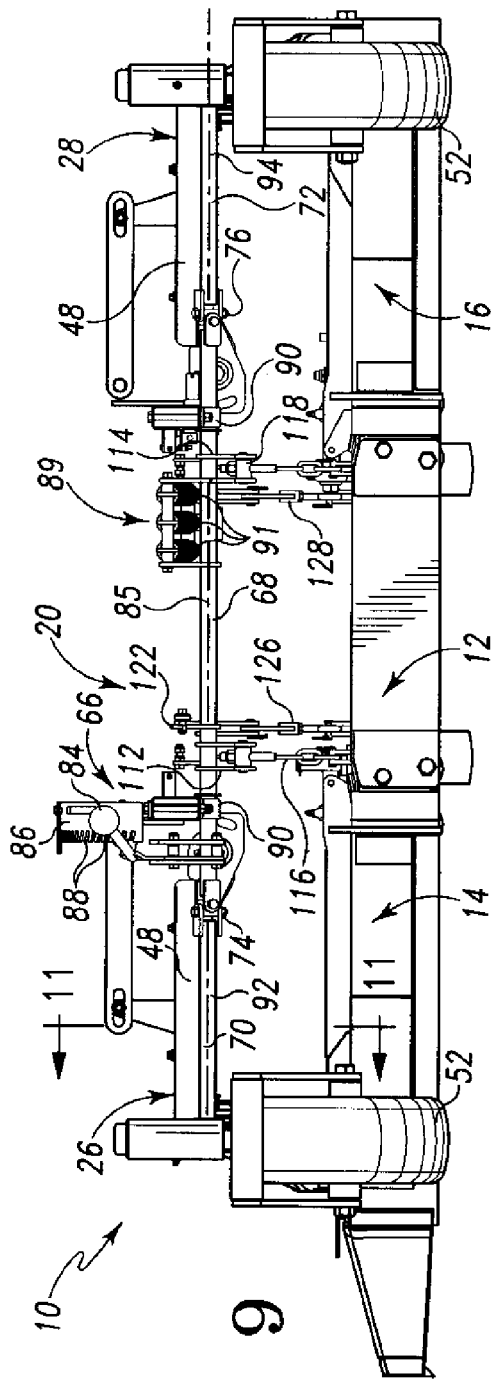

ARTICULATING DECK MOWER WITH DECK HEIGHT ADJUSTER

BACKGROUND

The present disclosure relates to an articulating deck mower. An articulating deck mower has a number of cutter decks which are used to cut grass and can move relative to one another in response to travel of the mower over the ground.

SUMMARY

According to the present disclosure, an articulating deck mower comprises a frame unit, first and second cutter decks, and a deck height adjuster. The first and second cutter decks are adapted to cut grass and mounted for movement relative to one another in response to variation in the level of the ground during movement of the mower over the ground. The deck height adjuster is configured to adjust the height of the cutter decks relative to the frame unit in response to actuation of an actuator included in the deck height adjuster and coupled to the cutter decks.

Exemplarily, the deck height adjuster further comprises first and second pivot shafts and a shaft coupler. The shaft coupler interconnects the first and second pivot shafts to allow the first and second pivot shafts to pivot together about their longitudinal axes and to allow the first and second pivot shafts to pivot relative to one another in response to variation in the level of the ground during movement of the mower over the ground. The actuator is arranged to pivot the first and second pivot shafts about their longitudinal axes to cause adjustment of the height of the first and second cutter decks relative to the frame unit in response to actuation of the actuator. The shaft coupler is, for example, a universal joint.

Further exemplarily, there are an intermediate cutter deck, first and second side cutter decks, an intermediate pivot shaft, first and second side pivot shafts, a first universal joint interconnecting the intermediate pivot shaft and the first side pivot shaft, and a second universal joint interconnecting the intermediate pivot shaft and the second side pivot shaft. The actuator is coupled to the intermediate pivot shaft to cause the pivot shafts to pivot about their longitudinal axes. Such pivotable movement of the pivot shafts is converted into a height adjustment of the cutter decks by motion converters associated with the cutter decks.

Additional features of the disclosure will become apparent to those skilled in the art upon consideration of the following description exemplifying the best mode of carrying out the disclosure as presently perceived.

BRIEF DESCRIPTION OF THE DRAWINGS

The detailed description particularly refers to the following figures in which:

FIG. 8 is a front elevation view of the articulating deck mower, with portions broken away, showing the deck height adjuster positioning the cutter decks in a raised position;

FIG. 9 is a front elevation view of the articulating deck mower, with portions broken away, showing the deck height adjuster positioning the cutter decks in a lowered position;

DETAILED DESCRIPTION

Figure 1:
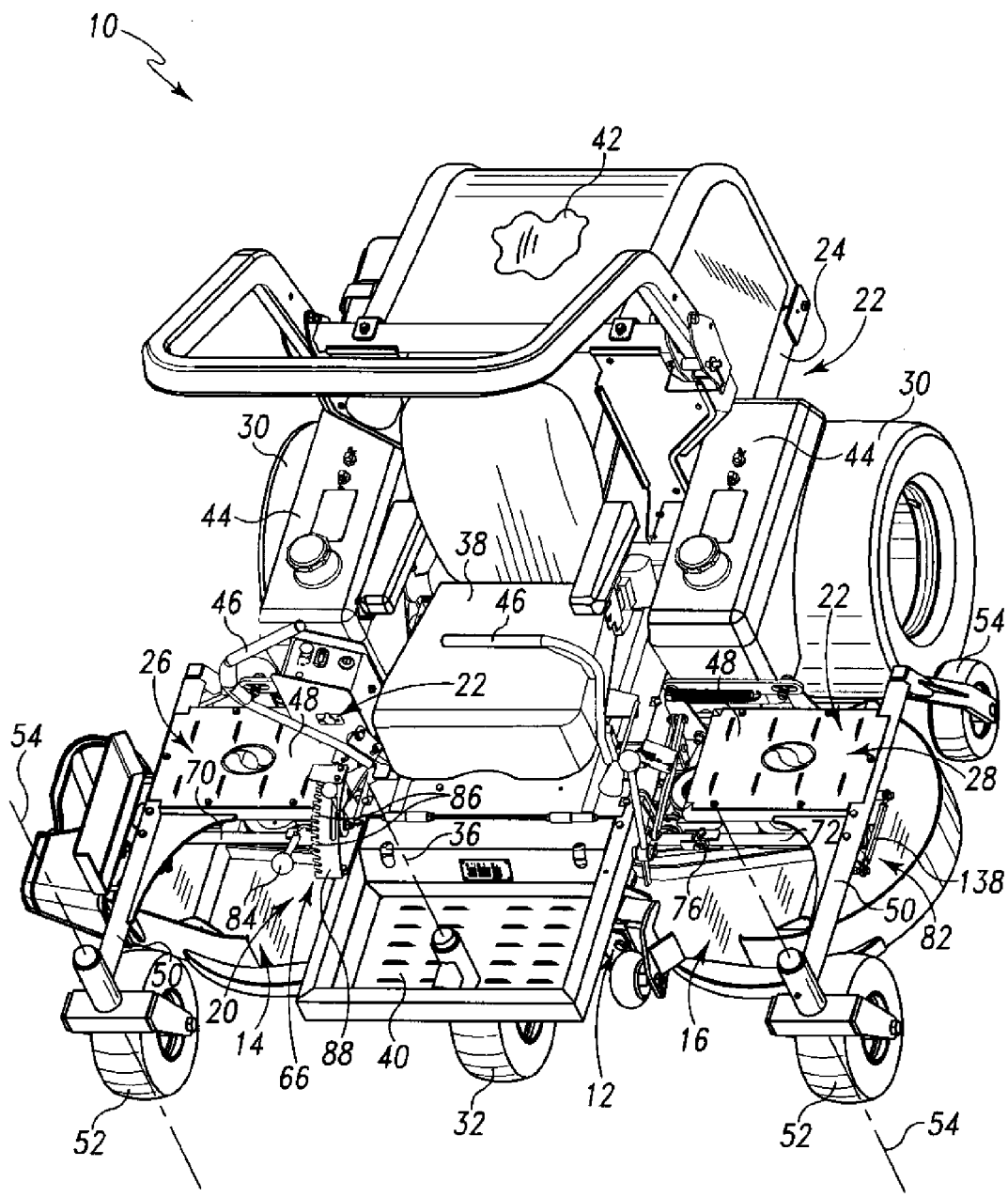
FIG. 1 is a perspective view of an articulating deck mower.
Figure 2:
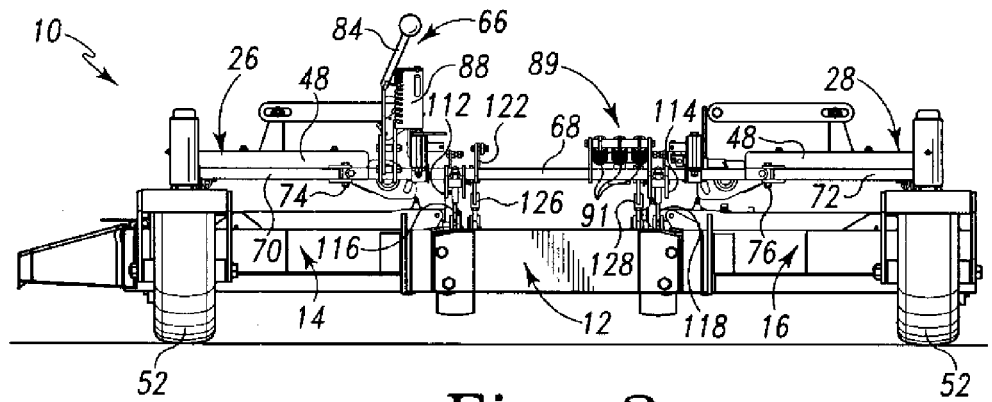
FIG. 2 is a front elevation view of the articulating deck mower, with portions broken away, showing an intermediate cutter deck located between first and second side cutter decks.
Figure 3:
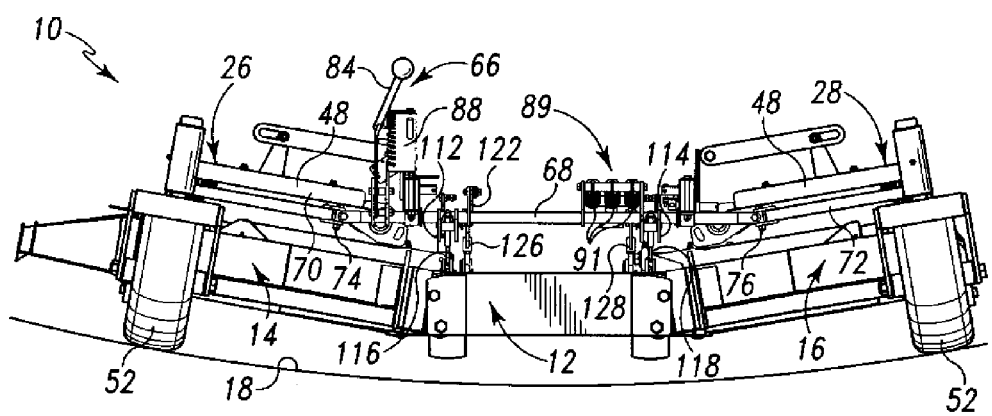
FIGS. 3 and 4 are front elevation views of the articulating deck mower, with portions broken away, showing movement of the first and second side cutter decks in response to variation of the level of the ground during movement of the mower over the ground.
Figure 4:
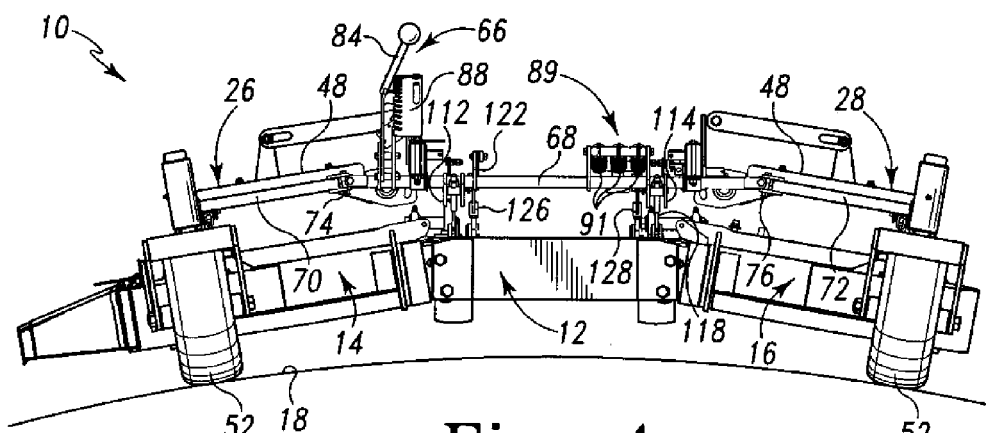

An articulating deck mower 10 comprises an intermediate cutter deck 12 and first and second side cutter decks 14, 16 positioned to opposite sides of intermediate cutter deck 12, as shown, for example, in FIGS. 1 and 2. Decks 12, 14, 16 are adapted to cut grass and are mounted for vertical movement relative to one another in response to variation in the level of the ground 18 during movement of mower 10 over the ground, as shown, for example, in FIGS. 3 and 4. Decks 12, 14, 16 are arranged in an inverted "V" cutter deck arrangement shown, for example, in FIG. 5 to provide for a reduced overall length of mower 10 and to facilitate use of only three chassis-support wheels to promote accurate grass cutting in areas where the ground 18 is uneven. A deck height adjuster 20 shown, for example, in FIGS. 6 and 7 is configured for selective adjustment of the height of decks 12, 14, 16 relative to a frame unit 22 of mower 10 between, for example, a raised position shown in FIGS. 8 and 10 and a lowered position shown in FIGS. 9 and 11.

Figure 6:
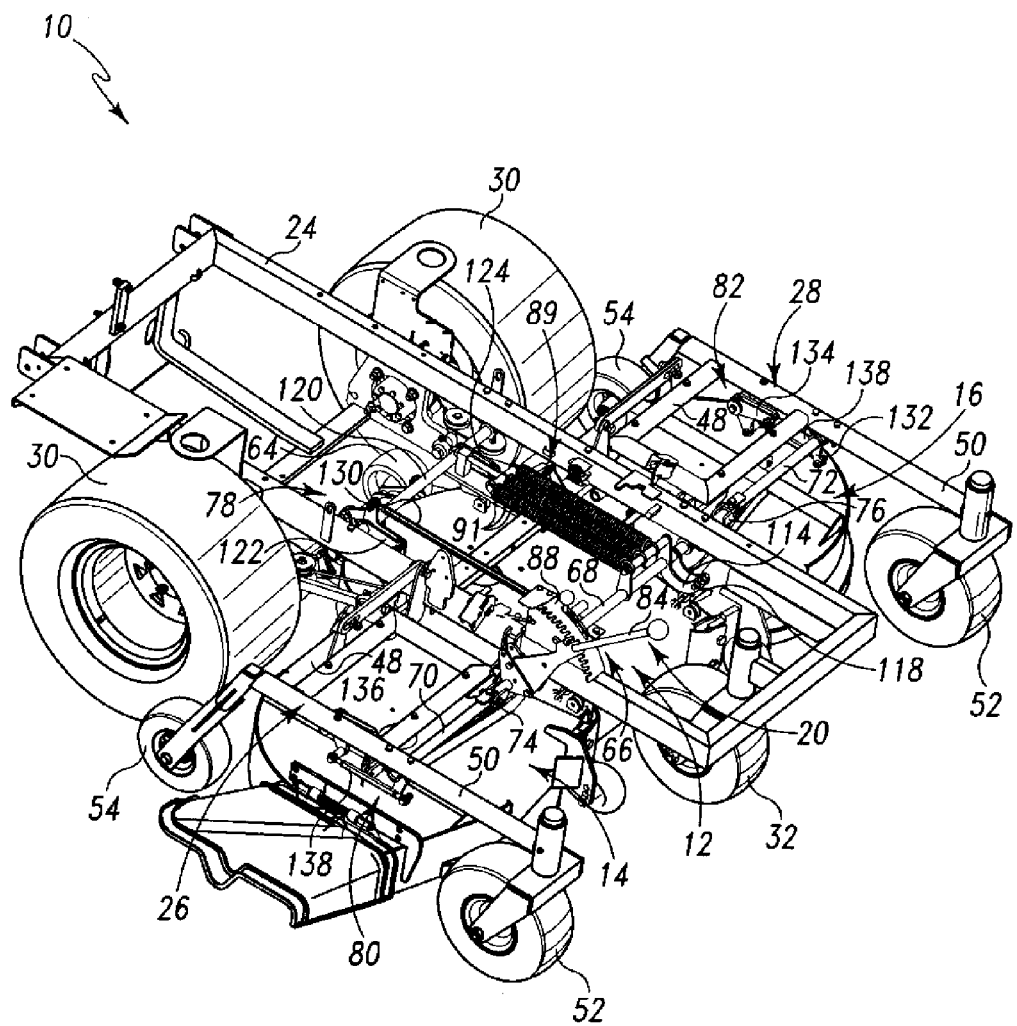
FIG. 6 is a perspective view of the articulating deck mower, with portions broken away.
Figure 7:
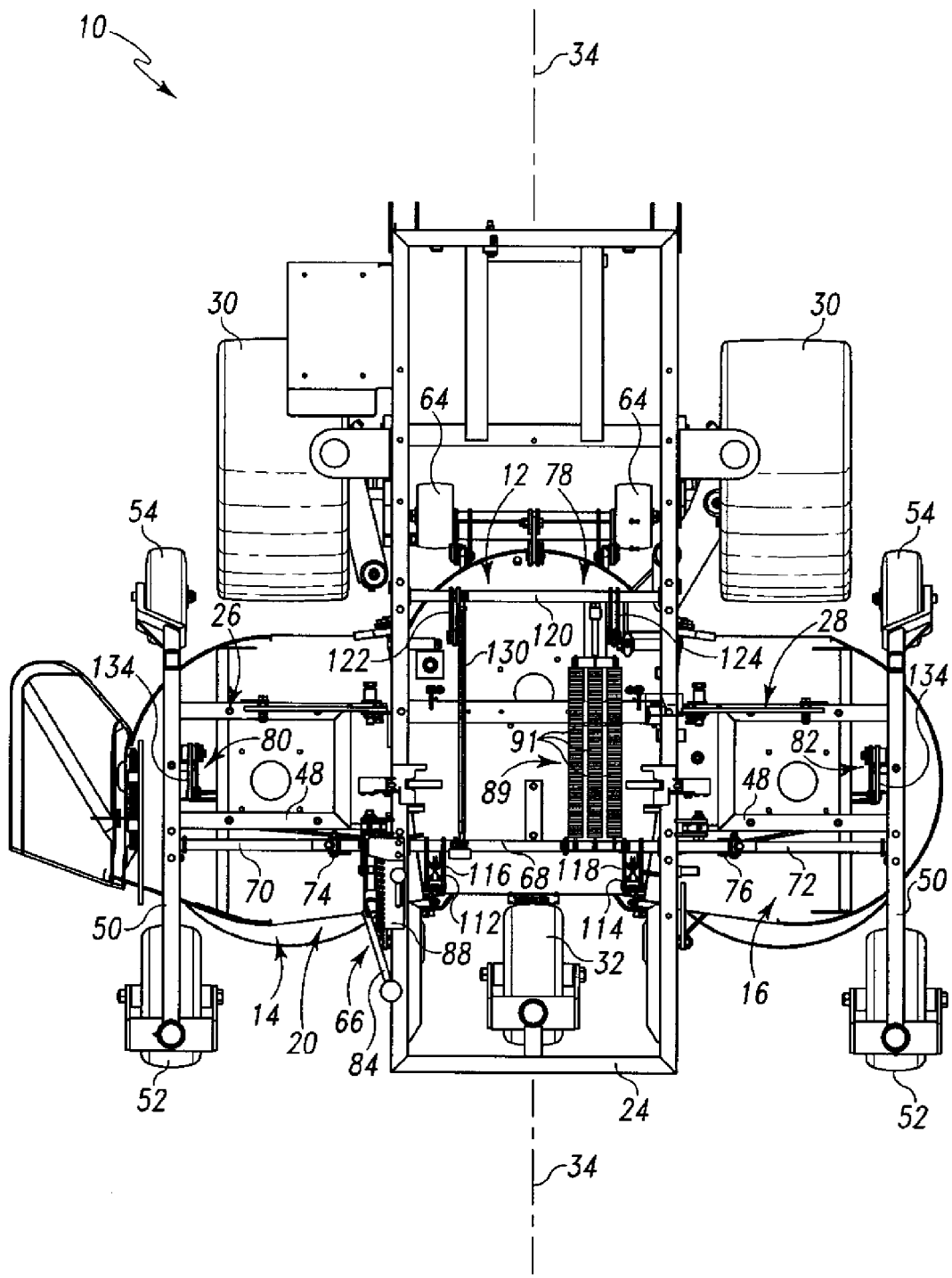
FIG. 7 is a top plan view of the articulating deck mower, with portions broken away.

Frame unit 22 comprises a chassis 24, a first rocker arm 26, and a second rocker arm 28, as shown, for example, in FIGS. 1, 6, and 7. Arms 26, 28 are coupled to opposite sides of chassis 24 for pivotable movement relative to chassis 24 in response to variation in the level of ground 18 during movement of mower 10 over ground 18, as shown, for example, in FIGS. 3 and 4.

Two chassis-support rear wheels 30 and a chassis-support front wheel 32 are coupled to chassis 24 and cooperate to support chassis 24, as shown, for example, in FIGS. 1 and 5–7. Rear wheels 30 are positioned to opposite sides of an imaginary central longitudinal plane 34 of chassis 24 (plane 34 is shown as a line in FIGS. 5 and 7 to represent that it is perpendicular to and coming out of the page in FIGS. 5 and 7). Front wheel 32 is positioned on plane 34 and forwardly of rear wheels 32. Front wheel 32 is configured, for example, as a caster that can rotate about a rotation axis 36.

A number of components are coupled to chassis 24 for support thereby. Such components include, for example, a seat 38, a foot-support platform 40 located forwardly of seat 38 and to which front wheel 32 is coupled for rotation about its rotation axis 36, an engine 42 located rearwardly of seat 38, fuel tanks 44 located to opposite sides of seat 38, and "zero-turn-radius" differential steering arms 46 located to opposite sides of seat 38, as shown, for example, in FIG. 1.

Each rocker arm 26, 28 comprises a support 48 pivotably coupled to and extending laterally outwardly from chassis 24, a bar 50 coupled to support 48, and front and rear arm-support wheels 52, 54 coupled to bar 50, as shown, for example, in FIGS. 1, 6, and 7. Front arm-support wheel 52 is configured, for example, as a caster that can rotate about a rotation axis 54.

Figure 5:
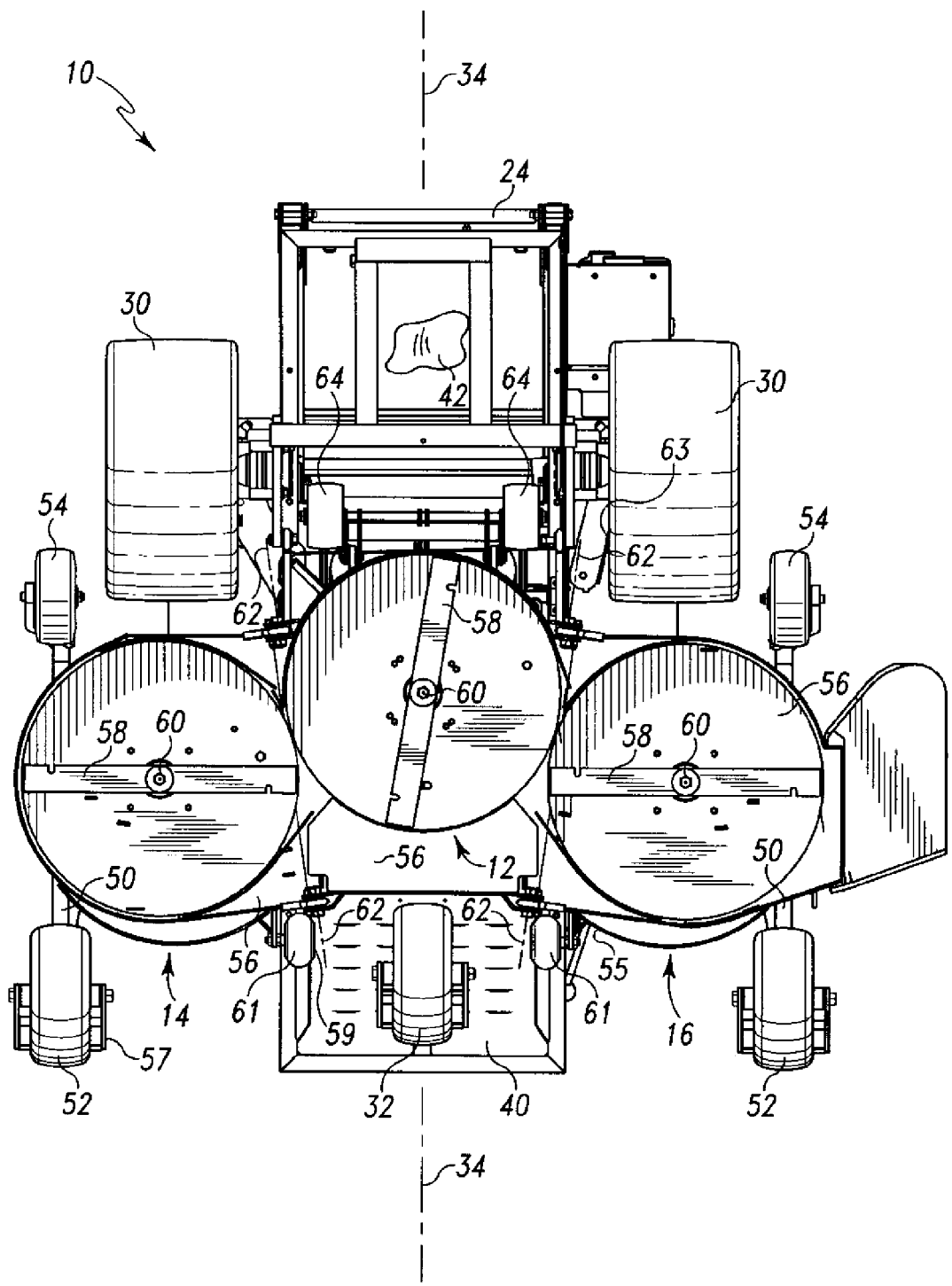
FIG. 5 is a bottom view of the articulating deck mower showing the intermediate cutter deck located rearwardly of the first and second side cutter decks such that the cutter decks are arranged in an inverted "V" arrangement.

Decks 12, 14, 16 cooperate to form an inverted "V" cutter deck arrangement, as shown, for example, in FIG. 5. Side cutter decks 14, 16 are positioned to opposite sides of intermediate cutter deck 12 and forwardly of rear wheels 30. Intermediate cutter deck 12 is positioned on plane 34 and rearwardly of front wheel 32 and side cutter decks 14, 16. As such, front wheel 32 is mounted for movement in a gap 55 defined between side cutter decks 14, 16, a gap 57 defined between front arm-support wheels 52, and a gap 59 defined between a pair deck-support wheels 61 coupled to a front side of side cutter decks 14, 16. Intermediate cutter deck 12 extends into a gap 63 defined between rear wheels 30. A pair of deck-support wheels 64 coupled to a rear side of intermediate cutter deck 12 is positioned in gap 63 defined between rear wheels 30. Intermediate cutter deck 12 is located closer to engine 42 than side cutter decks 14, 16.

Each deck 12, 14, 16 comprises a pan 56 and a grass-cutting blade 58 mounted in pan 56 for rotation about a rotation axis 60, as shown, for example, in FIG. 5. Pans 56 of side cutter decks 14, 16 are coupled to pan 56 of intermediate cutter deck 12 for pivotable movement of side cutter decks 14, 16 about pivot axes 62 which extend laterally outwardly from plane 34 as axes 62 extend rearwardly. Rotation axis 60 of intermediate cutter deck 12 is located rearwardly of rotation axes 60 of side cutter decks 14, 16. Pans 56 of side cutter decks 14, 16 cooperate to define 55 in which front wheel 32 is mounted for movement.

Deck height adjuster 20 is coupled to frame unit 22 and decks 12, 14, 16 and configured to adjust the height of decks 12, 14, 16 simultaneously relative to frame unit 22 in response to actuation of a single actuator 66, as shown, for example, in FIGS. 6–9. Adjuster 20 comprises actuator 66, an intermediate pivot shaft 68 pivotable in response to actuation of actuator 66 by a person, first and second side pivot shafts 70, 72, first and second shaft couplers 74, 76 interconnecting intermediate pivot shaft 68 with side pivot shafts 70, 72, an intermediate motion converter 78 arranged to convert pivotable movement of intermediate pivot shaft 68 into height adjustment of intermediate cutter deck 12 relative to chassis 24, and first and second side motion converters 80, 82 arranged to convert pivotable movement of side pivot shafts 70, 72 into height adjustment of side cutter decks 14, 16 relative to rocker arms 26, 28.

Actuator 66 comprises a lever 84 coupled to and extending radially from intermediate pivot shaft. Lever 84 is pivotable about a longitudinal axis 85 of intermediate pivot shaft 68 between a plurality of positions established by notches 86 formed in a plate 88 to receive lever 84 to allow selection of the height of decks 12, 14, 16. For example, lever 84 can be pivoted between a first position shown in FIG. 8 to position decks 12, 14, 16 in a raised position and a second position shown in FIG. 9 to position decks 12, 14, 16 in a lowered position.

An actuation assistance device 89 shown, for example, in FIGS. 6 and 7 is arranged to assist actuation of the actuator 66. Device 89 comprises a number (e.g., three) of springs 91 coupled to intermediate pivot shaft 68 and chassis 24 to counterbalance the weight of decks 12, 14, 16 to facilitate raising of decks 12, 14, 16 upon actuation of actuator 66 by a person.

Intermediate pivot shaft 68 is coupled to chassis 24 for pivotable movement about its longitudinal axis 85 in response to actuation of actuator 66 by a person. Shaft 68 extends through a pair of bearings 90 coupled to chassis 24.

First shaft coupler 74 interconnects intermediate pivot shaft 68 and first side pivot shaft 70 to allow pivotable movement of shafts 68, 70 together about their longitudinal axes 85, 92 upon pivotable movement of shaft 68 due to actuation of actuator 66 and to allow movement of shafts 68, 70 relative to one another in response to variation of the level of the ground 18 during movement of mower 10 over ground 18. Similarly, second shaft coupler 76 interconnects intermediate pivot shaft 68 and second side pivot shaft 72 to allow pivotable movement of shafts 68, 72 together about their longitudinal axes 85, 94 upon pivotable movement of shaft 68 due to actuation of actuator 66 and to allow movement of shafts 68, 72 relative to one another in response to variation of the level of the ground 18 during movement of mower 10 over ground 18.

Figure 12:
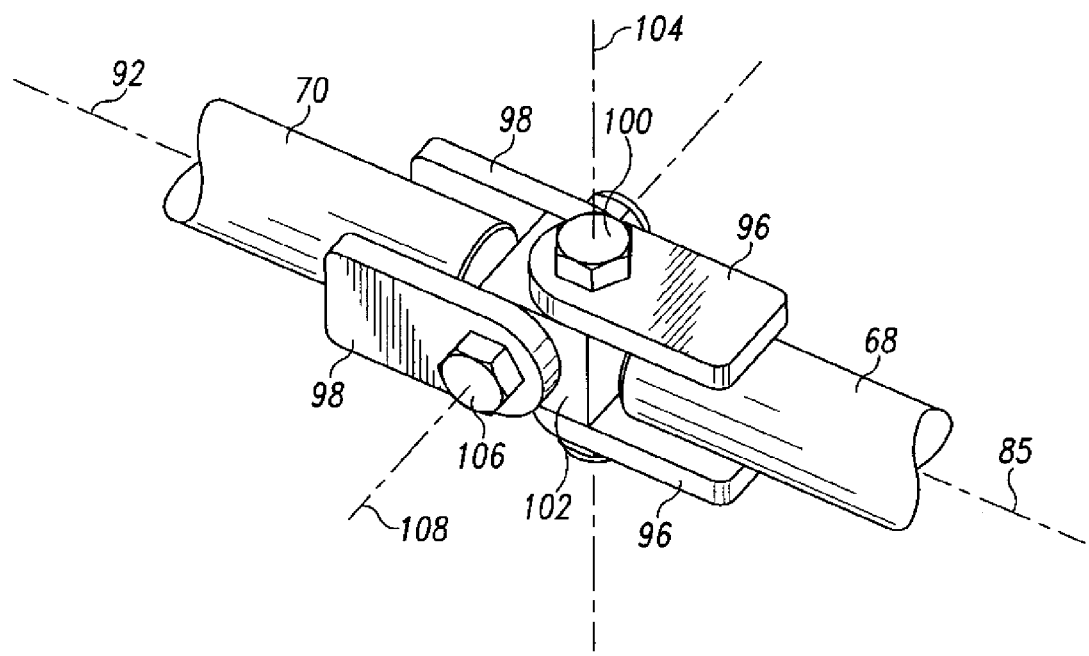
FIG. 12 is a perspective view showing an example of a shaft coupler that is used to couple together a pair of pivot shafts of the deck height adjuster and is configured, for example, as a universal joint.

Illustratively, each shaft coupler 74, 76 is configured as a universal joint, as shown, for example, in FIG. 12 with respect to first shaft coupler 74. Each universal joint 74, 76 comprises a pair of ears 96 coupled to intermediate pivot shaft 68, a pair of ears 98 coupled to the respective side pivot shaft 70, 72, an axle 100 coupled to ears 96 and a mount 102 to establish a pivot axis 104 for relative pivotable movement between intermediate pivot shaft 68 and the respective side pivot shaft 70, 72 about axis 104, and an axle 106 coupled to ears 98 and mount 102 to establish a pivot axis 108 for relative pivotable movement between intermediate pivot shaft 68 and the respective side pivot shaft 70, 72 about axis 108. Universal joints 74, 76 thus allow relative horizontal and vertical movement between intermediate pivot shaft 68 and side pivot shafts 70, 72.

Figure 13:
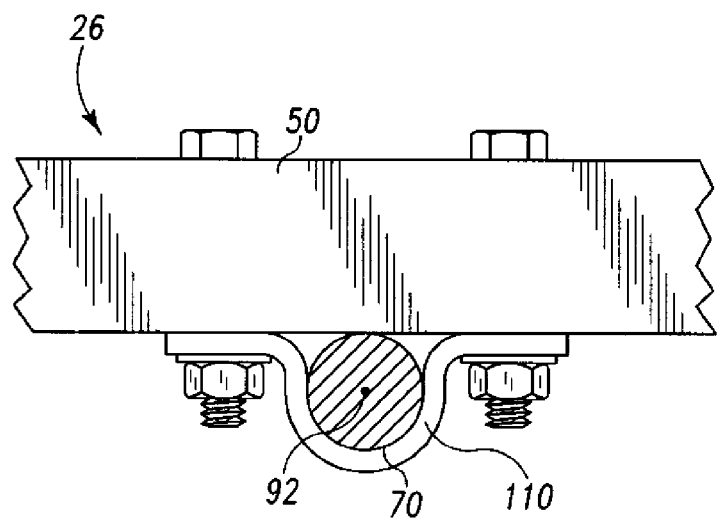
FIG. 13 is a sectional view taken along lines 13—13 of FIG. 8.

Each rocker arm 26, 28 comprises a bearing 110 coupled to an underside of bar 50, as shown, for example, in FIG. 13 with respect to rocker arm 26. Side pivot shaft 70 extends into bearing 110 of rocker arm 26 for pivotable movement of shaft 70 in bearing 110 and for axial movement of arm 26 along shaft 70 upon vertical pivotable movement of arm 26 relative to chassis 24. Side pivot shaft 72 extends into bearing 110 of rocker arm 28 for pivotable movement of shaft 72 in bearing 110 and for axial movement of arm 28 along shaft 72 upon vertical pivotable movement of arm 28 relative to chassis 24.

Intermediate motion converter 78 is arranged to convert pivotable movement of intermediate pivot shaft 68 into height adjustment of intermediate cutter deck 12. Converter 78 comprises spaced-apart first and second forward pivot arms 112, 114 extending radially from intermediate pivot shaft 68 and first and second forward links 116, 118 depending from first and second forward pivot arms 112, 114, respectively, to intermediate cutter deck 12 for height adjustment of a forward portion of deck 12 upon pivotable movement of shaft 68.

Converter 78 further comprises a rearward pivot shaft 120 coupled to chassis 24 for pivotable movement relative thereto, first and second rearward pivot arms 122, 124 extending radially from rearward pivot shaft 120, and first and second rearward links 126, 128 depending from first and second rearward pivot arms 122, 124, respectively, to intermediate cutter deck 12 for height adjustment of rearward portion of deck 12 upon pivotable movement of rearward pivot shaft 120. A tie rod 130 interconnects first forward pivot arm 112 and first rearward pivot arm 122 to transmit pivotable movement of intermediate pivot shaft 68 to rearward pivot shaft 120 to cause simultaneous height adjustment of the forward and rearward portions of the deck 12.

First side motion converter 80 is coupled to first side pivot shaft 70 and first side cutter deck 14 and configured to convert pivotable movement of first side pivot shaft 70 into height adjustment of first side cutter deck 14. Second side motion converter 82 is coupled to second side pivot shaft 72 and second side cutter deck 16 and configured to convert pivotable movement of second side pivot shaft 72 into height adjustment of second side cutter deck 16.

Figure 10:
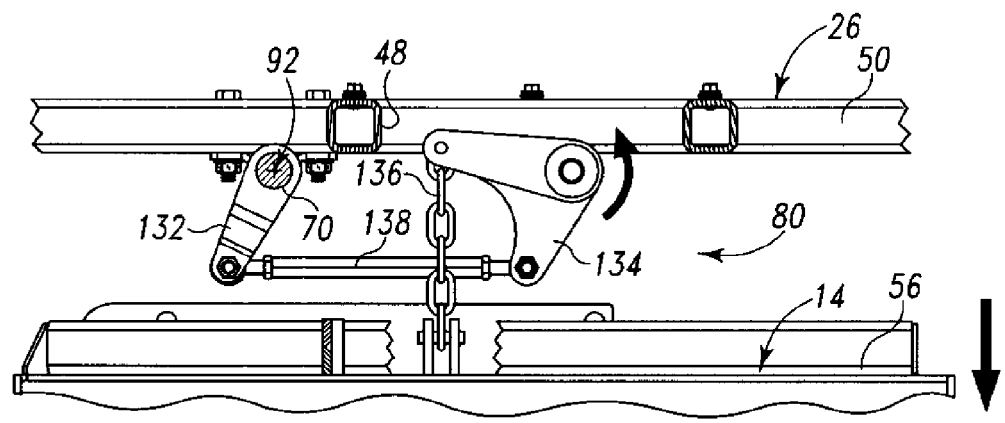
FIG. 10 is a sectional view taken along lines 10—10 of FIG. 8.
Figure 11:
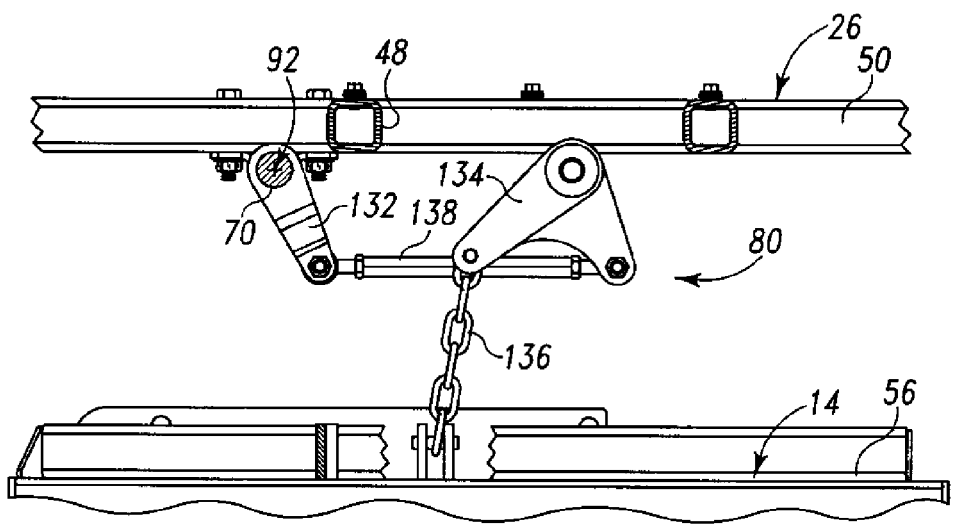
FIG. 11 is a sectional view taken along lines 11—11 of FIG. 9.

Each side motion converter 80, 82 comprises a forward pivot arm 132, a somewhat L-shaped rearward pivot arm 134, a link 136, and a tie rod 138, as shown, for example, in FIGS. 10 and 11 with respect to first side motion converter 80. Forward pivot arm 132 of first side motion converter 80 is coupled to and extends radially from first side pivot shaft 70. Forward pivot arm 132 of second side motion converter 82 is coupled to and extends radially from second side pivot shaft 72.

Rearward pivot arm 134 of converter 80 is coupled to first rocker arm 26 for pivotable movement relative thereto. Rearward pivot arm 134 of converter 82 is coupled to second rocker arm 28 for pivotable movement relative thereto.

Tie rod 138 of converter 80 interconnects forward and rearward pivot arms 132, 134 of converter 80 to transmit pivotable movement of forward pivot arm 132 of converter 80 to rearward pivot arm 134 of converter 80. Tie rod 138 of converter 82 interconnects forward and rearward pivot arms 132, 134 of converter 82 to transmit pivotable movement of forward pivot arm 132 of converter 82 to rearward pivot arm 134 of converter 82.

Link 136 of converter 80 depends from rearward pivot arm 134 of converter 80 to first side cutter deck 14 to raise and lower deck 14 in response to pivotable movement of arm 134 of converter 80. Link 136 of converter 82 depends from rearward pivot arm 134 of converter 82 to second side cutter deck 16 to raise and lower deck 16 in response to pivotable movement of arm 134 of converter 82.

It is within the scope of this disclosure for shaft couplers 74, 76 to be replaced by shaft couplers 174, 176, as shown, for example, in FIGS. 14–17. Each shaft coupler comprises a pivot arm 177, a pivot arm 178, and a tie rod 179.

With respect to the shaft coupler 174, pivot arm 177 is coupled to and extends radially from intermediate pivot shaft 68, pivot arm 178 is coupled to and extends radially from first side pivot shaft 70, and tie rod 179 interconnects arms 177, 178 to cause the shaft 70 to pivot about its axis 92 in response to pivotable movement of shaft 68 about its axis 85 and to allow relative vertical movement between shafts 68, 70 in response to variation in the level of the ground 18 during movement of mower 10 over ground 18. Shaft coupler 174 is thus configured to move to transmit pivotable movement of shaft 68 to shaft 70 to raise and lower cutter deck 14.

Figure 16:
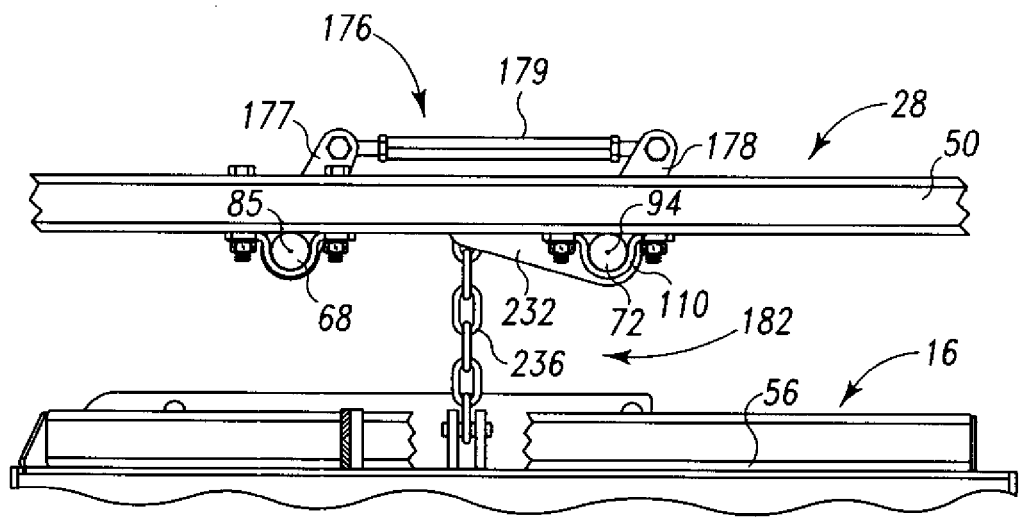
FIG. 16 is a right side elevation view showing one of the side cutter decks positioned in a raised position by one of the shaft couplers of FIG. 14.
Figure 17:
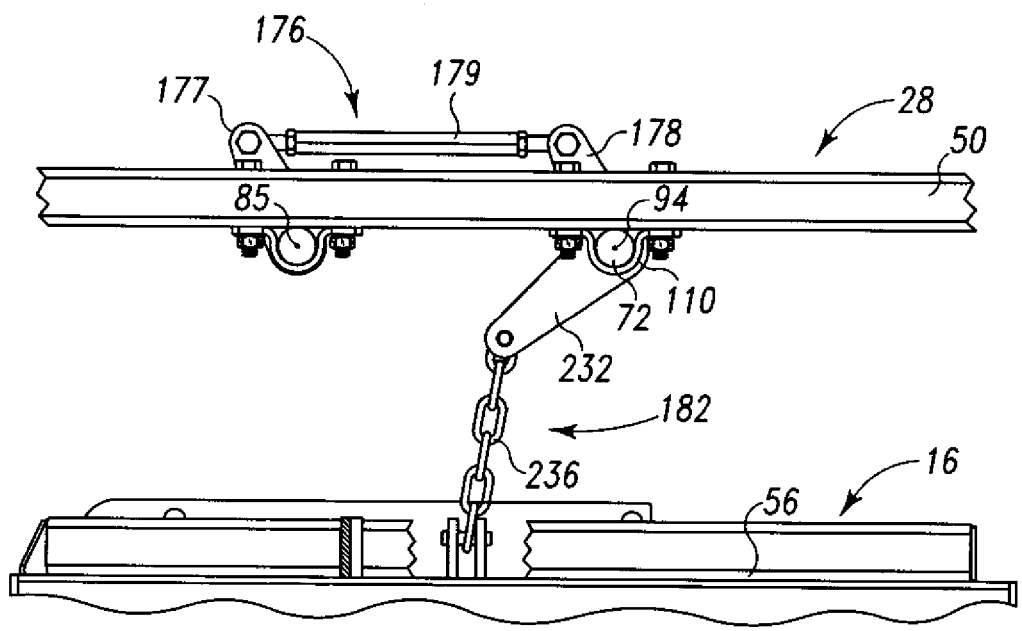
FIG. 17 is a right side elevation view similar to FIG. 16 showing one of the side cutter decks positioned in a lowered position by one of the shaft couplers of FIG. 14.

With respect to the shaft coupler 176 which is shown, for example, in FIGS. 16 and 17, pivot arm 177 is coupled to and extends radially from intermediate pivot shaft 68, pivot arm 178 is coupled to and extends radially from second side pivot shaft 72, and tie rod 179 interconnects arms 177, 178 to cause the shaft 72 to pivot about its axis 94 in response to pivotable movement of shaft 68 about its axis 85 and to allow relative vertical movement between shafts 68, 72 in response to variation in the level of the ground 18 during movement of mower 10 over ground 18. Shaft coupler 176 is thus configured to shift positions to transmit pivotable movement of shaft 68 to shaft 72 to raise cutter deck 16 as shown, for example, in FIG. 16 and to lower cutter deck 16 as shown, for example, in FIG. 17.

To facilitate relative vertical movement between shafts 68, 70 and between shafts 68, 72, each tie rod 179 comprises a ball joint at each end of tie rod 179. With respect to the tie rod 179 of shaft coupler 174, one of the ball joints is coupled to pivot arm 177 and the other ball joint is coupled to pivot arm 178. Similarly, with respect to the tie rod 179 of shaft coupler 176, one of the ball joints is coupled to pivot arm 177 and the other ball joint is coupled to pivot arm 178.

Figure 14:
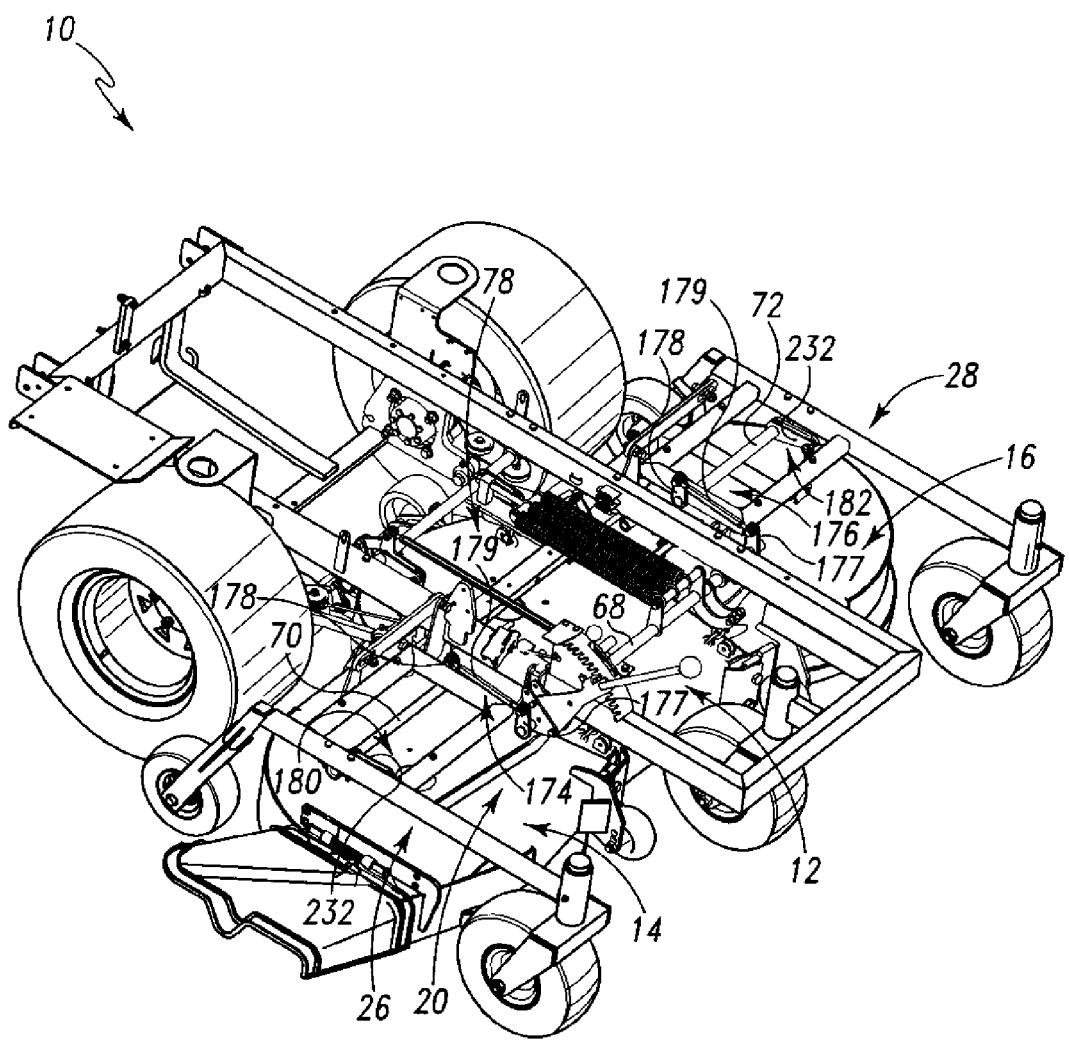
FIG. 14 is a perspective view of the articulating deck mower, with portions broken away, showing the deck height adjuster modified to include first and second shaft couplers according to another example, each shaft coupler including a first pivot arm coupled to an intermediate pivot shaft, a second pivot arm coupled to one of two side pivot shafts, and a tie rod interconnecting the first and second pivot arms.
Figure 15:
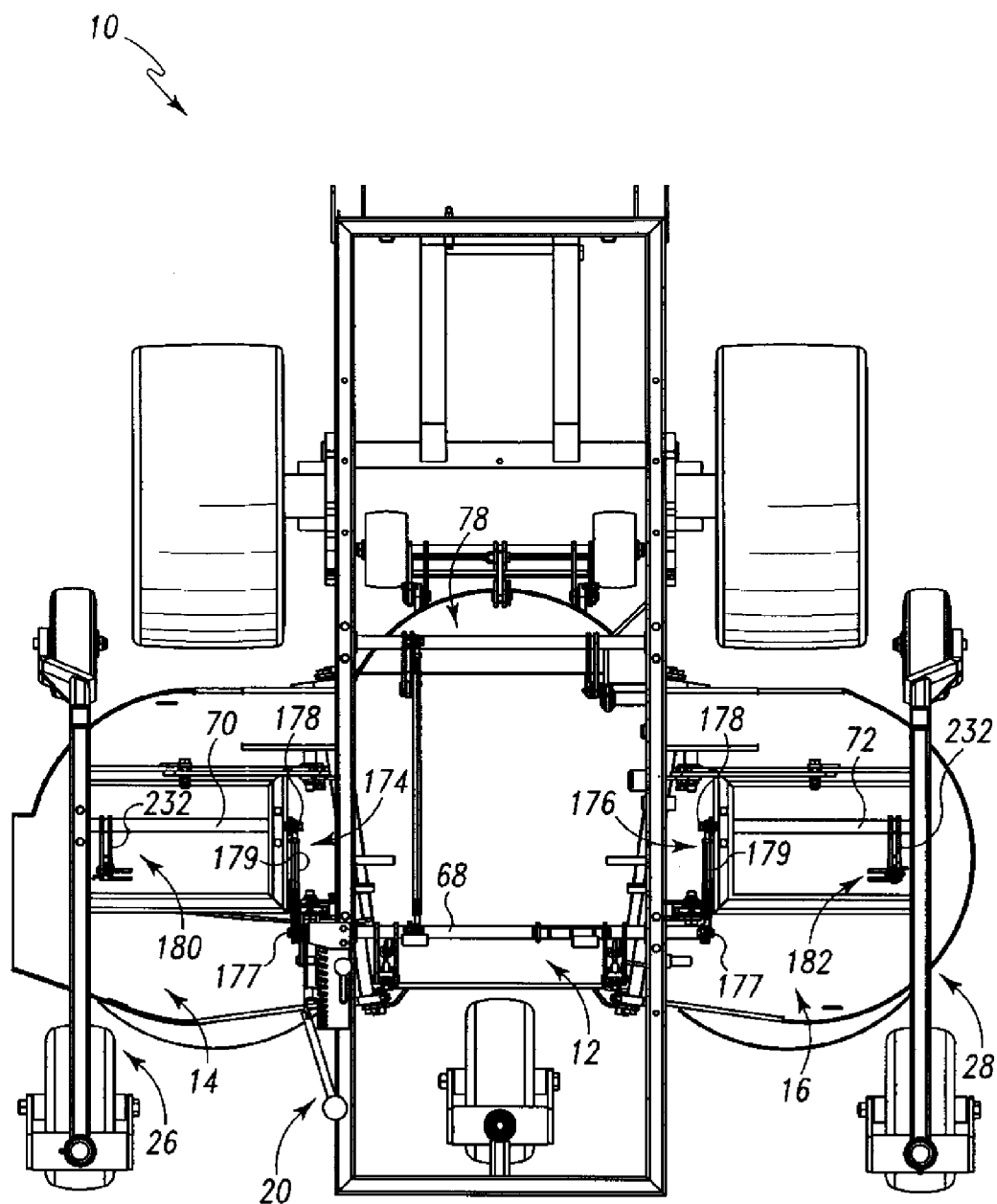
FIG. 15 is a top plan view of the articulating deck mower, with portions broken away, showing the modified deck height adjuster of FIG. 14.

When adjuster 20 includes shaft couplers 174, 176, first and second side motion converters 180, 182 replace first and second side motion converters 80, 82, as shown, for example, in FIGS. 14 and 15. First side motion converter 180 is arranged to convert pivotable movement of shaft 70 into height adjustment of cutter deck 14 relative to frame unit 22. Second side motion converter 182 is arranged to convert pivotable movement of shaft 72 into height adjustment of cutter deck 16 relative to frame unit 22.

Each converter 180, 182 comprises a pivot arm 232 and a link 236, as shown, for example, in FIGS. 16 and 17 with respect to converter 182. With respect to converter 180, pivot arm 232 is coupled to and extends radially from shaft 70 to pivot therewith and link 236 depends from arm 232 to cutter deck 14 to move deck 14 between a raised position and a lowered position in response to pivotable movement of arm 232. With respect to converter 182, pivot arm 232 is coupled to and extends radially from shaft 72 to pivot therewith and link 236 depends from arm 232 to cutter deck 16 to move deck 16 between raised and lowered positions in response to pivotable movement of arm 232.

Figure 18:
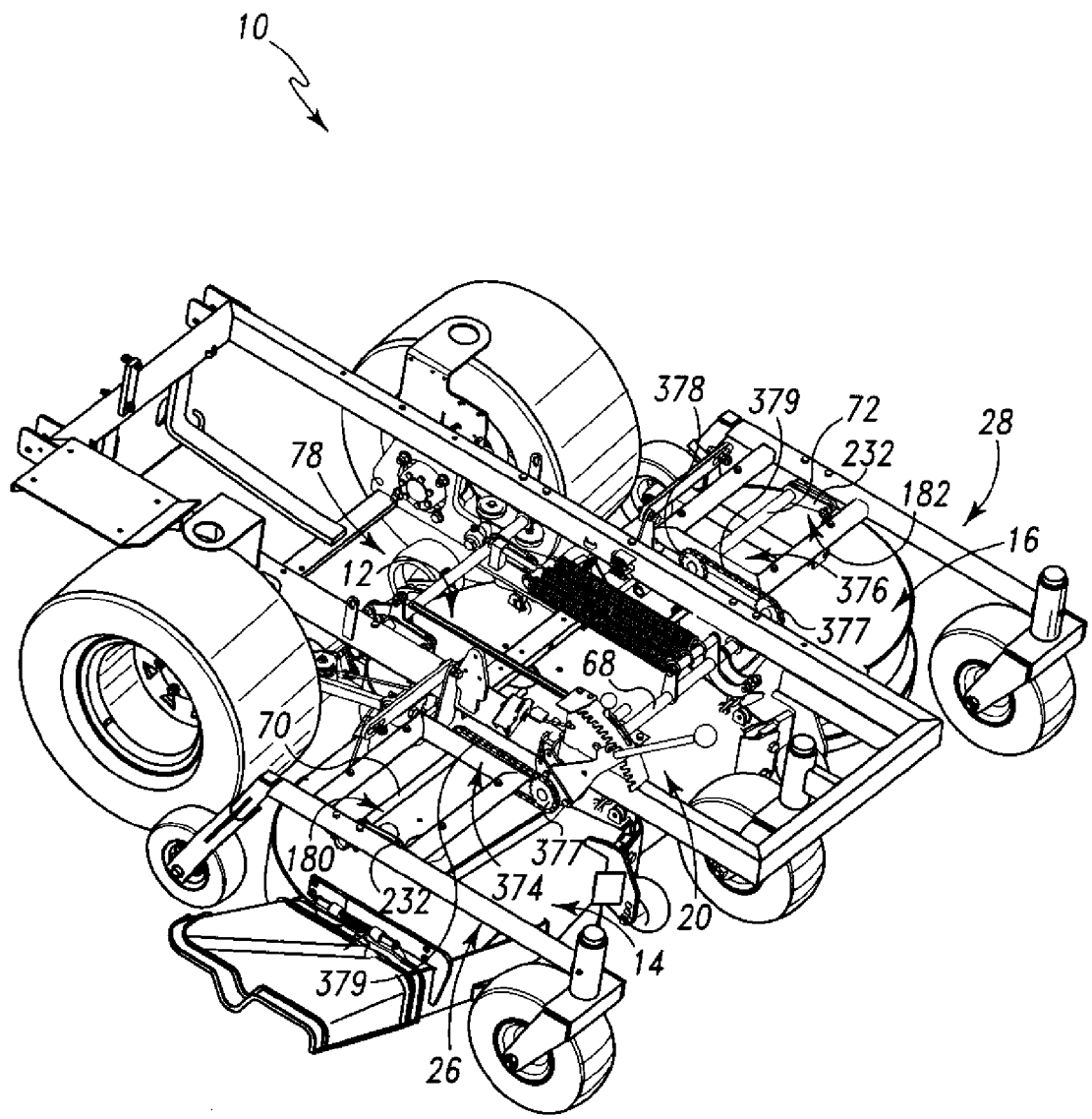
FIG. 18 is a perspective view of the articulating deck mower, with portions broken away, showing the deck height adjuster modified to include first and second couplers according to another example, each shaft coupler including a first sprocket coupled to the intermediate pivot shaft, a second sprocket coupled to one of the two side pivot shafts, and a chain extending around the first and second sprockets.

In a first exemplary modification of shaft couplers 174, 176, each of shaft couplers 374, 376 includes a first sprocket 377 in place of pivot arm 177, a second sprocket 378 in place of pivot arm 178, and a chain 379 in place of tie rod 179, as shown, for example, in FIG. 18.

With respect to shaft coupler 374, first sprocket 377 is coupled to and extends radially from intermediate pivot shaft 68 to pivot therewith, second sprocket 378 is coupled to and extends radially from first side pivot shaft 70, and chain 379 interconnects sprockets 377, 378 to transmit pivotable movement of first sprocket 377 to second sprocket 378. As such, the shaft coupler 374 is arranged to allow shafts 68, 70 to pivot together about their axes 85, 92 and to allow shafts 68, 70 to move vertically relative to one another in response to variation in the level of ground 18 during movement of mower 10 over ground 18.

With respect to shaft coupler 376, first sprocket 377 is coupled to and extends radially from intermediate pivot shaft 68 to pivot therewith, second sprocket 378 is coupled to and extends radially from second side pivot shaft 72, and chain 379 interconnects sprockets 377, 378 to transmit pivotable movement of first sprocket 377 to second sprocket 378. As such, shaft coupler 376 is arranged to allow shafts 68, 72 to pivot together about their axes 85, 94 and to allow shafts 68, 72 to move vertically relative to one another in response to variation in the level of ground 18 during movement of mower 10 over ground 18.

As such, each chain 379 provides an example of a closed loop and each sprocket 377, 378 provides an example of a rotatable loop mount around which the closed loop extends to transmit pivotable movement of one loop mount to the other loop mount.

Figure 19:
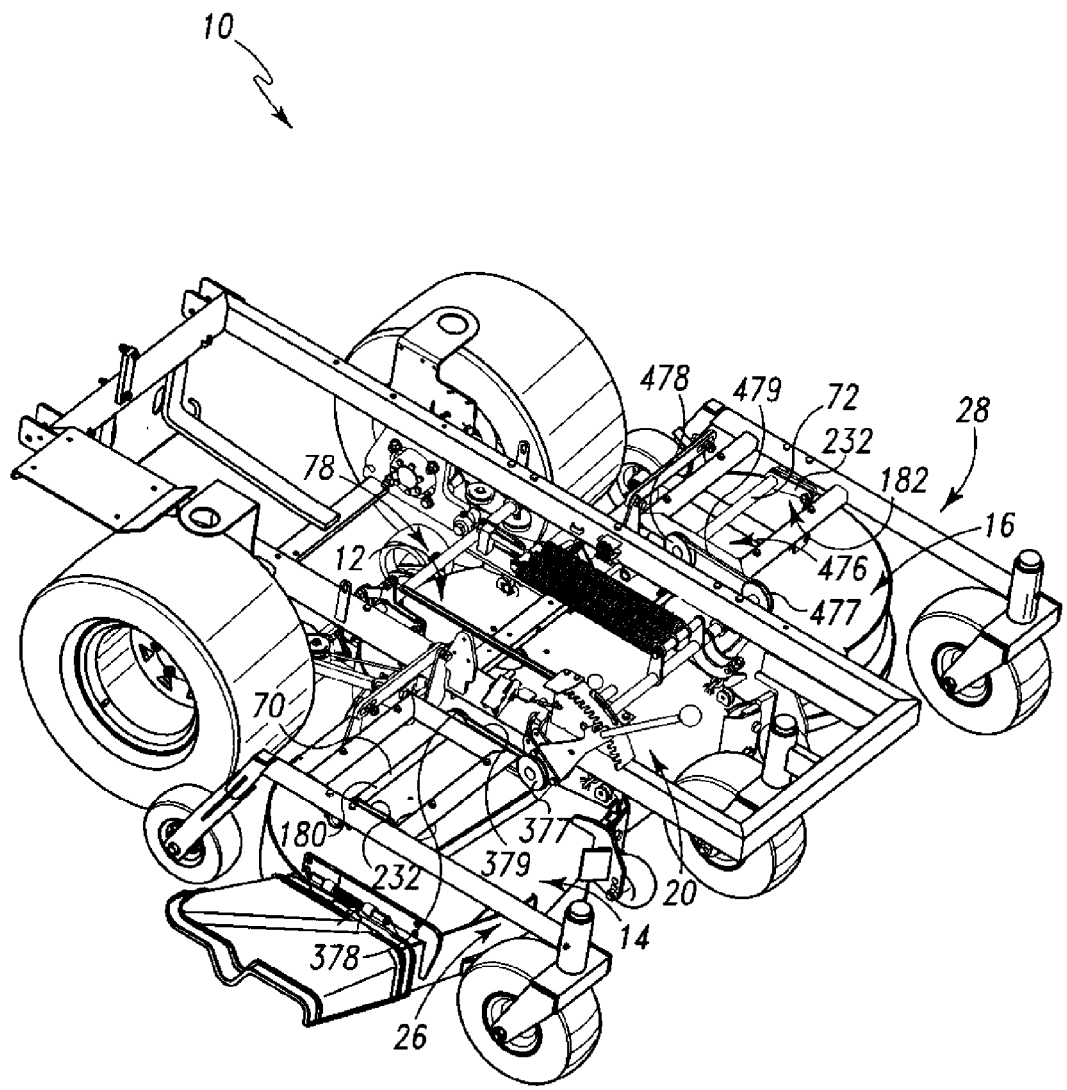
FIG. 19 is a perspective view of the articulating deck mower, with portions broken away, showing the deck height adjuster modified to include first and second couplers according to yet another example, each shaft coupler including a first pulley coupled to the intermediate pivot shaft, a second pulley coupled to one of the two side pivot shafts, and a belt extending around the first and second pulleys.

In a second exemplary modification of shaft couplers 174, 176, each of shaft couplers 474, 476 includes a first pulley 477 in place of pivot arm 177, a second pulley 478 in place of pivot arm 178, and an endless belt 479 in place of tie rod 179, as shown, for example, in FIG. 19.

With respect to shaft coupler 474, first pulley 477 is coupled to and extends radially from intermediate pivot shaft 68 to pivot therewith, second pulley 478 is coupled to and extends radially from first side pivot shaft 70, and belt 479 interconnects pulleys 477, 478 to transmit pivotable movement of first pulley 477 to second pulley 478. As such, the shaft coupler 474 is arranged to allow shafts 68, 70 to pivot together about their axes 85, 92 and to allow shafts 68, 70 to move vertically relative to one another in response to variation in the level of ground 18 during movement of mower 10 over ground 18.

With respect to shaft coupler 476, first pulley 477 is coupled to and extends radially from intermediate pivot shaft 68 to pivot therewith, second pulley 478 is coupled to and extends radially from second side pivot shaft 72, and belt 479 interconnects pulleys 477, 478 to transmit pivotable movement of first pulley 477 to second pulley 478. As such, shaft coupler 476 is arranged to allow shafts 68, 72 to pivot together about their axes 85, 94 and to allow shafts 68, 72 to move vertically relative to one another in response to variation in the level of ground 18 during movement of mower 10 over ground 18.

As such, each belt 479 provides an example of a closed loop and each pulley 477, 478 provides an example of a rotatable loop mount around which the closed loop extends to transmit pivotable movement of one loop mount to the other loop mount.

It is within the scope of this disclosure for adjuster 20 to include side motion converters 180, 182 in place of side motion converters 80, 82 when adjuster 20 includes either couplers 374, 376 or couplers 474, 476.

The invention claimed is:

1. An articulating deck mower comprising
a frame unit,
first and second cutter decks adapted to cut grass and mounted for movement relative to one another in response to variation in the level of the ground during movement of the mower over the ground, and
a deck height adjuster that is coupled to the frame unit and the first and second cutter decks and comprises first and second pivot shafts, a first shaft coupler interconnecting the first and second pivot shafts to allow the first and second pivot shafts to pivot together about their longitudinal axes and to allow the first and second pivot shafts to move to non-parallel positions relative to one another in response to variation in the level of the ground during movement of the mower over the ground, and an actuator arranged to pivot the first and second pivot shafts about their longitudinal axes to cause adjustment of the height of the first and second cutter decks relative to the frame unit in response to actuation of the actuator.

2. The articulating deck mower of claim 1, wherein the first shaft coupler is a universal joint.

3. The articulating deck mower of claim 1, wherein the deck height adjuster comprises a first motion converter coupled to the first pivot shaft and the first cutter deck to convert pivotable movement of the first pivot shaft into vertical movement of the first cutter deck relative to the frame unit.

4. The articulating deck mower of claim 3, wherein the first pivot shaft is coupled to the frame unit for pivotable movement relative thereto, the first motion converter comprises a first forward pivot arm extending radially from the first pivot shaft, a first forward link depending from the first forward pivot arm to a first forward location on the first cutter deck, a rearward pivot shaft coupled to the frame unit for pivotable movement relative thereto, a first rearward pivot arm extending radially from the rearward pivot shaft, a first rearward link depending from the first rearward pivot arm to a first rearward location on the first cutter deck, and a tie rod interconnecting the first forward pivot arm and the first rearward pivot arm.

5. The articulating deck mower of claim 4, wherein the first motion converter comprises a second forward pivot arm extending radially from the first pivot shaft, a second forward link depending from the second forward pivot arm to a second forward location on the first cutter deck, a second rearward pivot arm extending radially from the rearward pivot shaft, and a second rearward link depending from the second rearward pivot arm to a second rearward location on the first cutter deck.

6. The articulating deck mower of claim 3, wherein the deck height adjuster comprises a second motion converter coupled to the second pivot shaft and the second cutter deck to convert pivotable movement of the second pivot shaft into vertical movement of the second cutter deck relative to the frame unit.

7. The articulating deck mower of claim 1, wherein the frame unit comprises a chassis and a first rocker arm coupled to the chassis for vertical movement of the first rocker arm relative to the chassis in response to variation in the level of the ground during movement of the mower over the ground, the first pivot shaft is coupled to the chassis and the first cutter deck for height adjustment of the first cutter deck relative to the chassis, and the second pivot shaft is coupled to the first rocker arm and the second cutter deck for height adjustment of the second cutter deck relative to the first rocker arm.

8. The articulating deck mower of claim 7, wherein the first rocker arm comprises a bearing coupled to the first rocker arm, and the second pivot shaft extends in the bearing for pivotable movement of the second pivot shaft in the bearing upon actuation of the actuator and for axial movement of the first rocker arm along the second pivot upon vertical movement of the first rocker arm relative to the chassis.

9. The articulating deck mower of claim 5, wherein the deck height adjuster comprises a motion converter coupled to the second pivot shaft and the second cutter deck to convert pivotable movement of the second pivot shaft into vertical movement of the second cutter deck relative to the first rocker arm.

10. The articulating deck mower of claim 7, wherein motion converter comprises a first pivot arm extending radially from the second pivot shaft, a second pivot arm coupled to the first rocker arm for pivotable movement relative thereto, a tie rod interconnecting the first and second pivot arms, and a link depending from the second pivot arm to the second cutter deck.

11. The articulating deck mower of claim 1, further comprising a third cutter deck adapted to cut grass, wherein the first, second, and third cutter decks are mounted for vertical movement relative to one another in response to variation in the level of the ground during movement of the mower over the ground, the deck height adjuster is coupled to the third cutter deck and comprises a third pivot shaft and a second shaft coupler interconnecting the first and third pivot shafts to allow the first and third pivot shafts to pivot together about their longitudinal axes and to allow the first and third pivot shafts to move relative to one another in response to variation in the level of the ground during movement of the mower over the ground, and the actuator is arranged to pivot the first, second, and third pivot shafts to cause adjustment of the height of the first, second, and third cutter decks relative to the frame unit in response to actuation of the actuator by a person.

12. The articulating deck mower of claim 11, wherein the deck height adjuster comprises first, second, and third motion converters, the first motion converter is arranged to convert pivotable movement of the first pivot shaft into vertical movement of the first cutter deck relative to the frame unit, the second motion converter is arranged to convert pivotable movement of the second pivot shaft into vertical movement of the second cutter deck relative to the frame unit, and the third motion converter is arranged to convert pivotable movement of the third pivot shaft into vertical movement of the third cutter deck relative to the frame unit.

13. The articulating deck mower of claim 12, wherein each motion converter comprises a first pivot arm extending radially from one of the first motion converter, the second motion converter, and the third motion converter, a second pivot arm mounted for pivotable movement, a tie rod interconnecting the first and second pivot arms, and a link depending from the second pivot arm to one of the first cutter deck, the second cutter deck, and the third cutter deck.

14. The articulating deck mower of claim 11, wherein each of the first and second shaft couplers is a universal joint.

15. The articulating deck mower of claim 11, wherein the first shaft coupler comprises a first pivot arm extending radially from the first pivot shaft, a second pivot arm extending radially from the second pivot shaft, and a first tie rod interconnecting the first pivot arm and the second pivot arm, and the second shaft coupler comprises a third pivot arm extending radially from the first pivot shaft, a fourth pivot arm extending radially from the third pivot shaft, and a second tie rod interconnecting the third pivot arm and the fourth pivot arm.

16. The articulating deck mower of claim 11, wherein the first shaft coupler comprises a first sprocket extending radially from the first pivot shaft, a second sprocket extending radially from the second pivot shaft, and a first chain interconnecting the first and second sprockets, and the second shaft coupler comprises a third sprocket extending radially from the first pivot shaft, a fourth sprocket extending radially from the third pivot shaft, and a second chain interconnecting the third and fourth sprockets.

17. The articulating deck mower of claim 11, wherein the first shaft coupler comprises a first pulley extending radially from the first pivot shaft, a second pulley extending radially from the second pivot shaft, and a first belt interconnecting the first and second pulleys, and the second shaft coupler comprises a third pulley extending radially from the first pivot shaft, a fourth pulley extending radially from the third pivot shaft, and a second belt interconnecting the third and fourth pulleys.

18. The articulating deck mower of claim 11, wherein the first shaft coupler comprises a first loop mount coupled to the first pivot shaft, a second loop mount coupled to the second pivot shaft, and a first closed loop interconnecting and extending around the first loop mount and the second loop mount, and the second shaft coupler comprises a third loop mount coupled to the first pivot shaft, a fourth loop mount coupled to the third pivot shaft, and a second closed loop interconnecting and extending around the third loop mount and the fourth loop mount.

19. The articulating deck mower of claim 11, wherein the deck height adjuster comprises a first pivot arm extending radially from the second pivot shaft, a first link depending from the first pivot arm to the second cutter deck, a second pivot arm extending radially from the third pivot shaft, and a second link depending from the second pivot arm to the third cutter deck.

20. The articulating deck mower of claim 1, wherein the first shaft coupler comprises a first pivot arm extending radially from the first pivot shaft, a second pivot arm extending radially from the second pivot shaft, and a tie rod interconnecting the first pivot arm and the second pivot arm.

21. The articulating deck mower of claim 1, wherein the first shaft coupler comprises a first sprocket extending radially from the first pivot shaft, a second sprocket extending radially from the second pivot shaft, and a chain interconnecting the first and second sprockets.

22. The articulating deck mower of claim 1, wherein the first shaft coupler comprises a first pulley extending radially from the first pivot shaft, a second pulley extending radially from the second pivot shaft, and a belt interconnecting the first and second pulleys.

23. The articulating deck mower of claim 1, wherein the first shaft coupler comprises a first loop mount coupled to the first pivot shaft, a second loop mount coupled to the second pivot shaft, and a closed loop interconnecting and extending around the first loop mount and the second loop mount.

24. The articulating deck mower of claim 1, wherein the deck height adjuster comprises a pivot arm extending radially from the second pivot shaft and a link depending from the pivot arm to the second cutter deck.

25. The articulating deck mower of claim 1, wherein the actuator comprises a lever extending radially from the first pivot shaft.

* * * * *